United States Patent [19]

Klinedinst et al.

[11] 4,176,214
[45] Nov. 27, 1979

[54] LITHIUM-LEAD SULFATE PRIMARY ELECTROCHEMICAL CELL

[75] Inventors: Keith A. Klinedinst, Marlborough; Carl R. Schlaikjer, Winchester, both of Mass.

[73] Assignee: GTE Laboratories Incorporated, Stamford, Conn.

[21] Appl. No.: 973,648

[22] Filed: Dec. 26, 1978

[51] Int. Cl.² .............................................. H01M 4/58
[52] U.S. Cl. .................................. 429/194; 429/197; 429/227
[58] Field of Search ........................ 429/194, 197, 227

[56] References Cited

U.S. PATENT DOCUMENTS

| 4,018,970 | 4/1977 | Jumel et al. | 429/194 X |
| 4,049,892 | 9/1977 | Kronenberg | 429/194 |
| 4,085,259 | 4/1978 | Lauck | 429/194 |

FOREIGN PATENT DOCUMENTS 2516703 10/1976 Fed. Rep. of Germany .
2521769 11/1976 Fed. Rep. of Germany .

OTHER PUBLICATIONS

G. Lehmann et al., "The Copper Oxide-Lithium Cell"; 5th International Power Sources Symposium, Brighton, Eng. 1974.
G. Pistoia et al., "Lead Compounds as Cathode Materials for Lithium Cells", *Electrochemica Acta*, 1977, vol. 22, pp. 1141–1145.

*Primary Examiner*—Charles F. LeFevour
*Attorney, Agent, or Firm*—David M. Keay

[57] ABSTRACT

Disclosed is a primary electrochemical cell which employs a lithium metal anode, a lead sulfate cathode, and an electrolyte solution comprising a lithium salt in an organic solvent. The cell has an operating voltage and energy density sufficiently close to conventional 1.5 V cells to permit their direct replacement.

12 Claims, 6 Drawing Figures

LITHIUM-LEAD SULFATE PRIMARY ELECTROCHEMICAL CELL

FIELD OF THE INVENTION

The present invention relates to the field of electrochemical cells; and more particularly to the field of primary electrochemical cells having a discharge voltage of around 1.5 V.

BACKGROUND OF THE INVENTION

Primary electrochemical cells are a class of voltaic cells. Voltaic cells are those electrochemical cells in which chemical changes produce electrical energy, in distinction to electrolysis cells in which electrical energy from an outside source produces chemical changes within the cell. Primary cells are those voltaic cells which cannot be conveniently recharged, which usually are discarded after a single exhaustion of their component elements, or which require replacement of their exhausted chemical constituents to bring them back to their original condition. These cells are distinguished from another class of voltaic cells, namely, secondary cells, in which the exhausted cell is charged by passing electrical current from an outside source through it in the reverse direction of the discharge current.

In a primary cell, chemical energy is converted to electrical energy with a reduction in the free energy of the system. In the course of the cell reaction, negative charge leaves the anode, travels through an external driven circuit, and re-enters the cell at the cathode. Thus, the cathode is the positive electrode and the anode is the negative electrode. By virtue of the established electromotive series, it is possible to select suitable cathodes and anodes to obtain a desired theoretical voltage. The ideal cell would give the theoretical voltage under continued, constant load and the loss in free energy would manifest itself entirely as electrical energy outside the cell. However, this ideal is never attained in practice, because the internal resistance of a cell is not zero and the reactions within the cell are never completely reversible. Moreover, problems of incompatibility of the cathode and anode with each other or with the electrolyte, polarization, and other well known problems prevent performance at theoretical values.

The demand for existing aqueous electrolyte primary electrochemical cells with actual discharge voltages of about 1.5 V is increasing rapidly with the popularity of cordless electrical entertainment, communications, and technical equipment. Currently, the major part of this demand is satisfied by two types of cells often referred to as the Leclanche or alkaline manganese dioxide/zinc cell. These cells use zinc anodes and manganese dioxide cathodes, wherein the cathode material is mixed with carbon to provide electronic conductivity. The electrolyte is in an aqueous solution of either ammonium chloride and zinc chloride or potassium hydroxide with potassium zincate. These aqueous cells suffer from the possibility of gas formation by reaction of the anode with the electrolyte and may not, therefore, be hermetically sealed. Further, the working voltage at constant load for these cells decreases steadily with the extent of discharge.

There have recently appeared in the literature a number of different electrochemical cells which employ lithium as the active anode material and which discharge at about 1.5 V. Lithium has several inherent advantages associated with its use, among which are high capacities and high specific energies coupled with a high degree of stability and long storage life times. Among these are the Li/CuO system (SAFT; G. Lehmann et al, 5th International Power Sources symposium, Brighton, 1974), the Li/PbCrO$_4$ and Li/PbO$_2$ systems (G. Pistoia et al, Electrochemica Acta, 22, pp. 1141-1145, 1977), the Li/Bi$_2$O$_3$ system (Varta; U.S. Pat. No. 4,085,259), the Li/antimony oxide systems (Sb$_2$O$_3$, SbO$_2$ and Sb$_2$O$_5$) (Varta; Ger. Offen. No. 2,516,703), and the Li/PbSiO$_3$ and Li/CuAl$_2$O$_4$ systems (Varta; Ger. Offen. No. 2,521,769).

The Pistoia reference further identifies some of the inherent advantages in the use of lead compounds which makes them worthy of further investigation as cathodes for lithium cells; however, there is no mention in this reference of a cell employing a lead sulfate cathode.

SUMMARY OF THE INVENTION

It is an object of the present invention to provide a new electrochemical cell containing a lithium anode which will discharge at about 1.5 V.

It is a further object of the present invention to provide a new 1.5 V lithium battery which provides a relatively steady working voltage over an extended period of discharge.

It is yet another object of the present invention to provide a 1.5 V cell which will provide a suitable replacement for conventional cells and can be hermetically sealed to provide an additional margin of safety.

These and other objects are accomplished according to the present invention which provides an improved lithium electrochemical cell which comprises: (a) an anode comprising lithium metal; (b) a cathode comprising lead sulfate; said anode and cathode being spaced from each other in contact with (c) an electrolytic solution which comprises a dissociable lithium salt dissolved in a liquid organic solvent.

In a preferred embodiment of the invention, the cathode will contain a minor amount of a material less electropositive than the lead sulfate, whereby a first constant discharge voltage will be obtained by virtue of the lead sulfate until exhaustion of the lead sulfate, and then a second, reduced discharge voltage will be effected to signal near exhaustion of the cell but permit continued use.

BRIEF DESCRIPTION OF THE DRAWINGS

The present invention will become more apparent and will be better understood when the following detailed description is read in conjunction with the drawings wherein.

DETAILED DESCRIPTION OF THE INVENTION

The cells described herein have lithium anodes and lead sulfate cathodes. They have operating voltages at a constant load, with a current density of about 1.0 mA/cm$^2$, of about 1.5 V. Thus, these cells may be used as direct replacements for all applications for which either conventional Leclanché or alkaline manganese cells are used. The theoretical energy density in watt hours per pound or per cubic inch of these lithium/lead sulfate cells is about the same as that of the standard Leclanché cell. However, because a non-aqueous electrolyte is employed there is no danger of the gas formation associated with the Leclanché cell, and the cells may be hermetically sealed. Significantly, the working voltage does not decline substantially with time until close to the end of the discharge. Thus, the cell discharges more efficiently and reliably than the standard Leclanché cell. And, in a preferred embodiment of the invention, near exhaustion of the cell is indicated by a second plateau or stepped down voltage near the end of the useful life of the cell.

Figure 1:
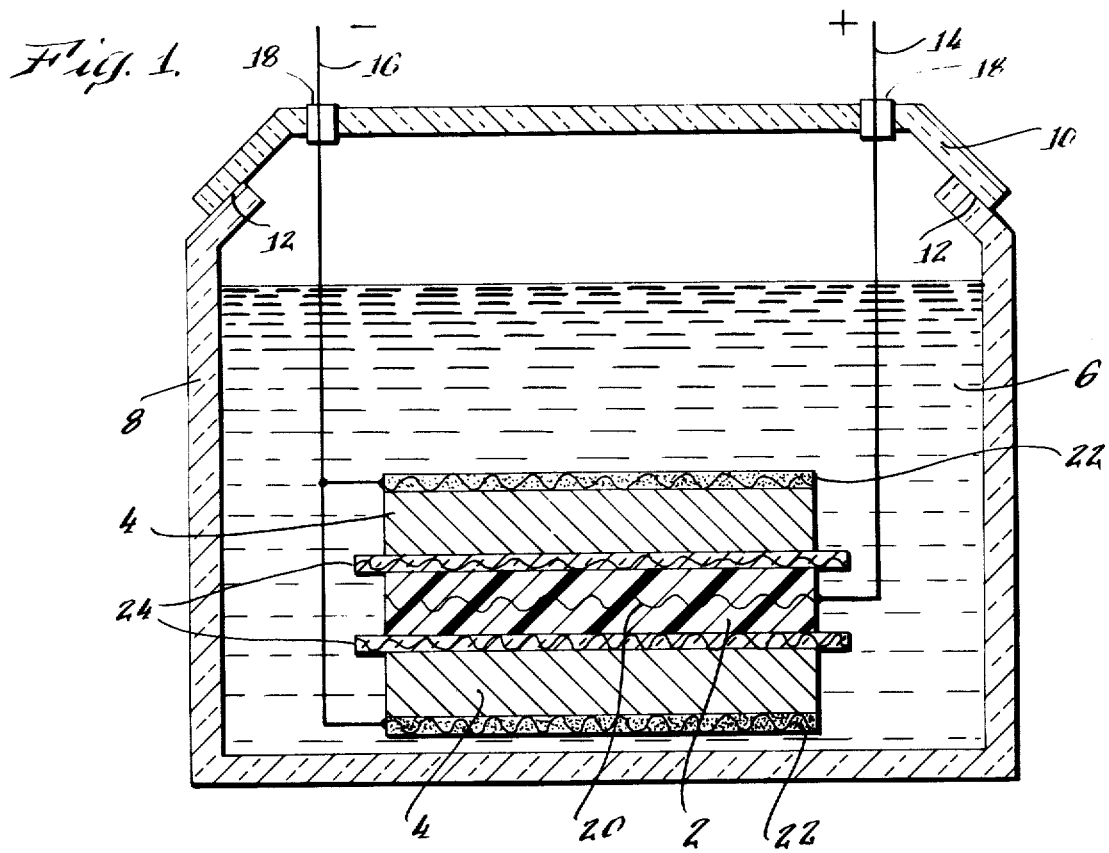
FIG. 1 is a cross-sectional schematic diagram of one embodiment of an electrochemical cell according to the present invention.

Referring to FIG. 1, there is seen a cross-sectional view of a cell in accordance with the present invention. The cell has a lead sulfate (PbSO$_4$) cathode 2 and a lithium metal anode 4. In this particular embodiment, an excess of electrolytic solution 6 is provided within the sealed container 8 which can be of suitable material such as glass. The container top 10 can be sealed to the main body portion of the container 8 by a ground glass joint 12 or other suitable sealing arrangement. Current leads 14 and 16, which can be sealed to the container top by suitable glass to metal seals 18, are connected to current collectors 20 at the cathode and 22 at the anode. Mechanical separators 24, between the electrodes are preferably used.

Figure 3:
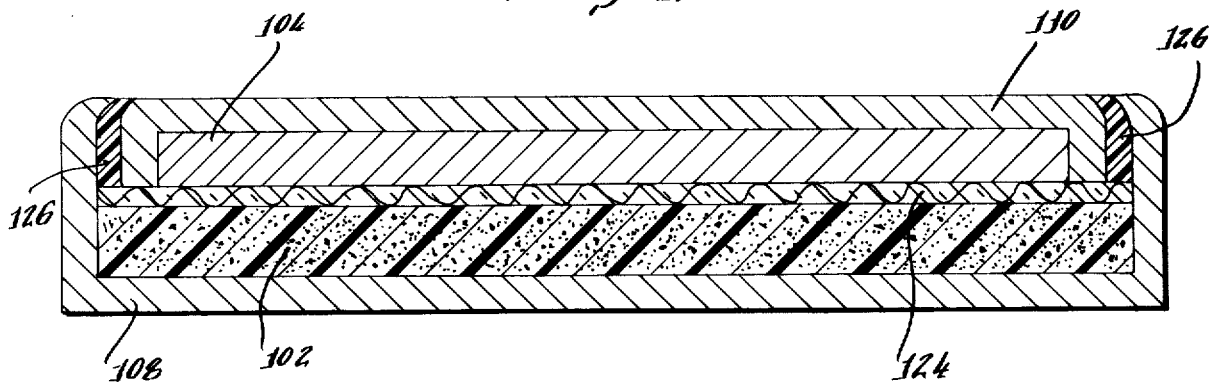
FIG. 3 is a cross-sectional schematic representation of a button cell made in accordance with the present invention.

A button cell embodiment of this invention is shown in cross-section in FIG. 3. The cathode 102 and the anode 104 are both shown as flat discs. The cathode 102 is in direct contact with the bottom 108 of the button cell can and the anode 104 is in direct contact with the top 110 of the cell. An insulating ring 126 is shown between the bottom 108 and top 110 of the can. The cathode 102 and anode 104 are spaced from each other by spacer 124 which is saturated with electrolytic solution.

Figure 5:
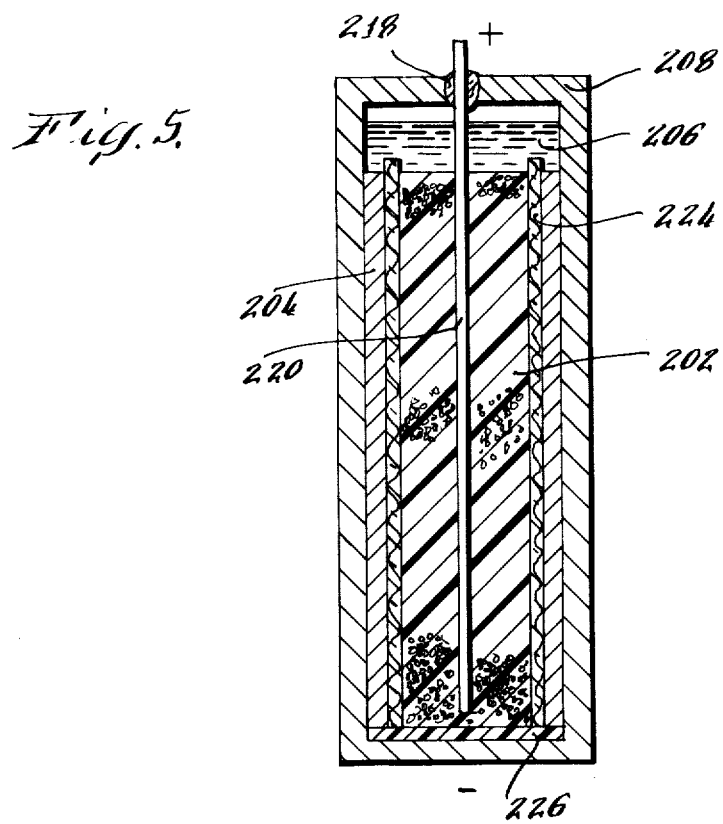
FIG. 5 is a cross-sectional schematic representation of an AA cell constructed in accordance with the present invention.

A conventional AA size cell, but made in accordance with the present invention, is shown in cross-section in FIG. 5. In this embodiment, the cathode 202 is shown in the center of the cell, spaced from the anode 204 by porous separator 224. The cathode is also spaced from the bottom of cell can 208 by an insulating disc 226. The anode 204 is in direct contact with the can 208, the can thereby functioning as the current collector. The cathode 202 is provided with current collector 220 which passes to the exterior of the cell through seal 218. In this embodiment, sufficient space is provided in the head of the cell for excess electrolyte 206.

The anodes employed according to this invention comprise lithium metal which is preferably attached to an appropriate metallic current collector. The purity of the lithium should be 95% or better. The preferred anode will thus consist essentially of pure lithium metal. Lithium prepared by fused salt electrolysis is presently preferred. The shape of the anode is not important, but can be of any suitable configuration for the type of cell desired.

The cathodes according to this invention should contain as high a percentage of lead sulfate as possible; however, while they preferably consist essentially of PbSO$_4$, they preferably contain amounts of a conductivity-improving material and a binder material as are necessary to provide effective cathodes under the desired conditions of use. Also, as will be described in more detail below, they may contain a minor amount of a material, such as lead sulfide, (PbS), which is less electropositive than the lead sulfate, to act as an indicator that the cell is nearly exhausted but yet permits continued use at a lower, constant discharge voltage.

A suitable polymeric material such as polytetrafluoroethylene (PTFE) can be employed to effectively bond the cathodes together. While any level of this or other binding agent which is effective to provide sufficient dimensional stability to hold the cathode together under conditions of intended use may be employed, it is presently believed that inclusion of from about 3 to 50% of a binder is preferred.

The cathodes also preferably contain sufficient conductive material to give the cathode sufficient electronic conductivity. Preferably, the conductive material will be a material selected from the group consisting of carbon black, graphite, lead powder, and mixtures thereof. To obtain a cathode capable of efficiently operating in an electrochemical cell, its specific conductivity should be greater than about $10^{-3}$ ohm$^{-1}$ cm$^{-1}$, and preferably should be about $5 \times 10^{-3}$ ohm$^{-1}$ cm$^{-1}$ or above. Typically, from 5 to 20% by weight of the graphite, carbon black or other inert conductor or mixtures of conductors will be employed. Preferably, about 10 wt.% total of a mixture of graphite and carbon black is preferred. Best cell performances have been obtained using 85% lead sulfate, 5% graphite, 5% carbon black and 5% PTFE, all percentages being by weight.

Discharge curves for cells prepared according to the present invention show that the final degree of porosity of the cathode affects discharge characteristics of the cell. The porosity of the cathode can be increased from 8% to 18% resulting in a large increase in cell capacity. Similarly, a cell having a cathode constrained within a standard battery exhibits a reduced cell capacity as opposed to a cell having the cathode in an excess of electrolyte. These results suggest that it is the volume available for cathode expansion during cell discharge which determines the completeness of the discharge process. In the presence of excess electrolyte and with the anode and cathode separated from each other by at least several millimeters, twice as much electrical energy is produced during cell discharge as when the two electrodes are constrained within the walls of a standard battery can and are separated by only a thickness of a sheet of porous separator paper. Thus, it appears that of the two following cell discharge reactions:

$$2Li + PbSO_4 \rightarrow Pb + Li_2SO_4, \tag{1}$$

$$4Li + PbSO_4 \rightarrow Pb + Li_2SO_3 + Li_2O. \tag{2}$$

reaction (1) is believed to predominate during discharge of the cell where the cell components are confined within a standard battery case or the cathode is otherwise confined, and produces two equivalents of electric charge per mole of lead sulfate; however, if the cathode is not so confined but is able to expand freely as it discharges, the reaction of equation (2) is believed to predominate and twice as much electrical energy will be produced per mole of lead sulfate. The operating characteristics of a cell constructed to perform according to equation (2) would thus be preferred; however, the weight and volume charge densities of a cell constructed to perform according to equation (1) compare favorably to prior art cells, including the Li/Bi$_2$O$_3$ cell described by Varta, vide supra. While not wishing to be bound to any particular theory of operation, the foregoing explanation is provided for the purpose of setting forth the best understanding of the operation of the invention at this time.

According to a preferred method of preparing the cathode from its various components, the components are provided in powdered form and are than well mixed and, if desired, co-ground to further homogenize the mixture. The mixture is then preferably pressed in an appropriately shaped die so as to cause the particles of lead sulfate, binder material and inert conductor to come into intimate contact. A metallic or nonmetallic current collector, such as an expanded metal grid, may be embedded with the pressed material during this operation or the consolidated cathode may be later pressed onto an appropriate current collector. If desired, the pellet of pressed cathode material can be partially broken up for use in particulate form or for later reformation into another desired shape.

The solvent in which the lithium salt is dissolved to form the electrolyte solution preferably comprises one or more organic liquids which singly or mixed together are capable of dissolving the dissociable lithium salt. A wide variety of organic compounds can be employed singly or mixed, as long as they are capable of dissolving the lithium salt to produce a conductive solution, and do not foster or take part in undesirable side reactions involving the anode, cathode, separator, or cell hardware. It is preferred that compounds have a liquid range between $-40°$ and $+50°$ C., a viscosity not exceeding 1 centipoise at 25° C., and a dielectric constant of at least 10 at 25° C. However, mixtures may be employed to take advantage of desirable features and offset less desirable ones. Thus, a compound with a high melting point and high viscosity but high dielectric constant (ethylene carbonate) or a compound with a low boiling point and a low dielectric constant, but a low freezing point and low viscosity (diethyl ether), would still be useful when present in a mixture.

Among the various organic liquids suitable as solvents will be: (1) aliphatic ethers, acetals, and ketals; (2) alicyclic ethers, acetals, and ketals; (3) esters, orthoesters and cyclic esters; (4) aliphatic and aromatic nitro compounds; (5) inorganic esters; (6) aliphatic, alicyclic and aromatic tertiary amines; (7) substituted and cyclic amides; (8) nitrides, (9) aldehydes and (10) ketones.

It is preferred to use a mixture of solvents selected from suitable aliphatic ethers, esters and cyclic ethers. Preferred solvents are those selected from the group consisting of propylene carbonate (PC), dimethoxyethane (DME), dimethyl carbonate (DMC), tetrahydrofuran (THF), 1,4-dioxane and mixtures of these. Binary mixtures are preferred, especially where propylene carbonate is selected as one solvent. The preferred solvent mixture contains from about 20 wt.% to about 60 wt.% of PC. Preferred systems can comprise about 40 wt.% PC and about 60 wt.% of an aliphatic ether like DME, an ester like DMC or a cyclic ether like THF or 1,4-dioxane. A particularly preferred solvent system will comprise 40 wt.% PC and about 60 wt.% DME.

The lithium salt which is necessary to form the electrolyte solution is preferably one which is substantially soluble and dissociates to ionic species such that the specific conductivity is greater than $10^{-4}$ ohm$^{-1}$ cm$^{-1}$. The reactivity of the salt with the solvent, the anode, the cathode, the separator, or cell hardware, is preferably negligible or does not allow a loss of electrical capacity on standing in excess of 5% per year for hermetically sealed cells. Most preferably, the salt is a member selected from the group of lithium salts which consists essentially of lithium perchlorate (LiClO$_4$), lithium hexafluoroarsenate (LiAsF$_6$), lithium hexafluorophosphate (LiPF$_6$), lithium tetrachloroaluminate (LiAlCl$_4$) and lithium tetrafluoroborate (LiBF$_4$), and mixtures of these.

As referred to briefly above, these cells can be made with a built-in indicator system which allows discharge at a first nearly constant potential of around 1.5 V for the major portion of the cell life, followed by discharge at a second, reduced, but nearly constant potential for an additional period of time. This indicator effect is obtained by employing with the lead sulfate cathode a minor amount of lead sulfide, a material less electropositive than the lead sulfate. Thus, when the lead sulfate is near exhaustion, the potential drops from its first, constant level of about 1.5 V to a second level. Lead sulfide can typically be employed at a level of from 5 to 50 wt.% with about 15-20 wt.% being most preferred. As stated above, the Li/PbSO$_4$ cell discharge at about 1.5 V (at a current density of about 1 mA/cm$^2$). A similar cell in which the cathode contains a mixture of PbSO$_4$ and PbS also discharges at about 1.5 V. However, after the 1.5 V discharge, the potential drops to about 1.25 V and remains steady at this voltage until the end of the discharge. The fraction of the discharge which occurs at 1.5 V can be controlled by varying the relative amounts of PbSO$_4$ and PbS contained within the cathode. By this sudden lowering of its output potential by about 15% close to the end of its discharge, the cell can be made to 'inform' the electronic circuitry into which it is incorporated that the end of its useful life is approaching. This automatic signaling feature can be used to notify the operator of the device that the cell should be replaced, or alternatively the device itself could be programmed to automatically switch to a standby (backup) cell when this signal has been received. This new signaling feature makes the Li/PbSO$_4$ cell preferable to the standard 1.5 V Leclanché-type or alkaline manganese cell for which it can be exchanged. These standard "dry cell" batteries experience a gradual decline in potential throughout their useful life, and thus do not possess a similar definite ability to warn of impending failure.

The following examples are presented for the purpose of further illustration and explaining the present invention and are not to be taken as limiting in any regard. Unless otherwise indicated, all parts and percentages are by weight.

EXAMPLE 1

This example illustrates the construction and discharge of a cell of the type shown in FIG. 1, in accordance with the present invention.

Cathode material was prepared containing 70% $PbSO_4$, 20% graphite and 10% PTFE by thoroughly mixing and grinding 0.450 gm $PbSO_4$, 0.128 gm graphite, and 0.064 gm PTFE with a mortar and pestle. A pellet die was then used to press a cathode wafer about 2.5 $cm^2$ in area. An expanded nickel metal current collector was embedded within the wafer during the pressing condition. This cathode wafer was then sandwiched between two 0.030 inch thick lithium anodes as shown in FIG. 1. A single piece of 0.005 inch thick porous glass separator paper was placed between each face of the cathode wafer and the lithium anode. Nickel metal current collectors and lead wires were used and the cell was contained within a Pyrex glass container. The cell was assembled and the glass container was then evacuated. The evacuated cell was filled with a 1.0 M solution of $LiClO_4$ as the electrolyte salt in a solvent mixture of 40 wt.% propylene carbonate and 60 wt.% dimethoxyethane.

Figure 2:
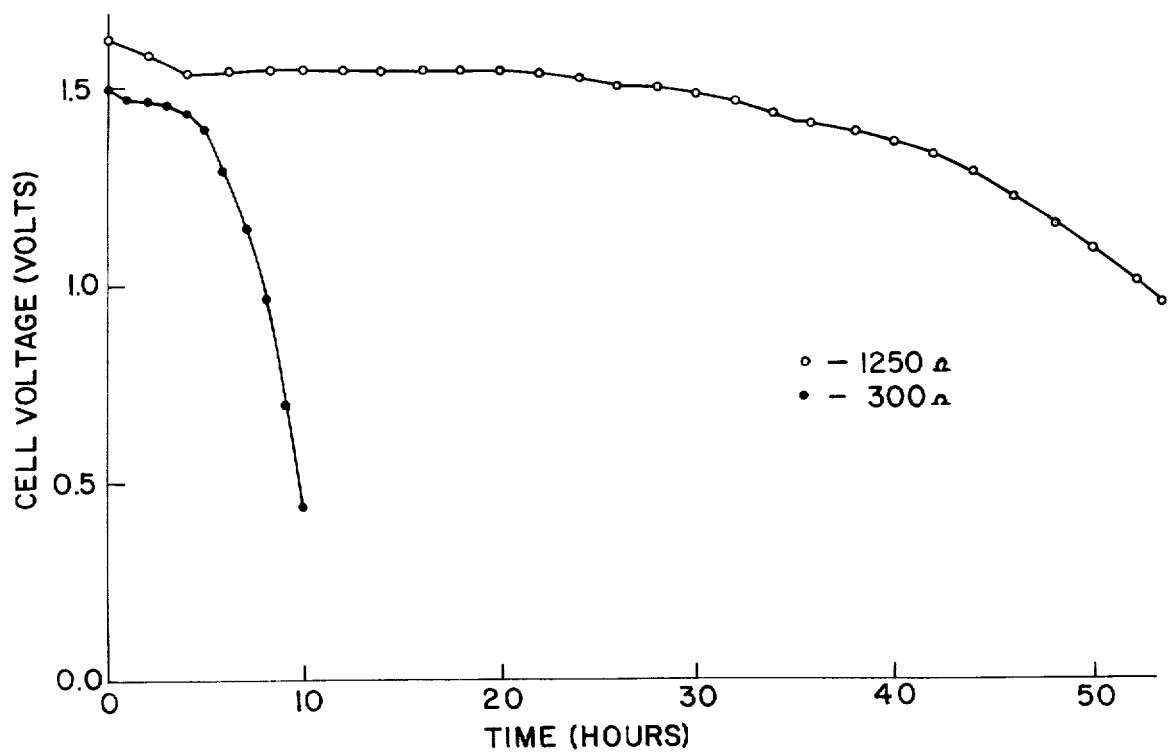
FIG. 2 is a graph showing the variation between discharge voltage and discharge time for a cell as shown in FIG. 1 and as described in Example 1.

The cell was discharged across a constant 1250 ohm resistor, and the resulting discharge curve is shown in FIG. 2. The average discharge voltage was 1.44 V and the average current density was 0.24 $mA/cm^2$.

Another identical cell was assembled and discharged across a constant 300 ohm resistor. The resulting discharge curve is also shown in FIG. 2. In this case, the average cell voltage was 1.37 V, and the average current density was 0.86 $mA/cm^2$.

EXAMPLE 2

Another $Li/PbSO_4$ cell was prepared, identical to that described in Example 1, except that the electrolyte salt was 1.0 M $LiAsF_6$. The cell as discharged across a 300 ohm resistor. The average cell voltage was 1.43 V, and the average current density was 0.92 $mA/cm^2$.

EXAMPLE 3

Another $Li/PbSO_4$ cell was prepared according to Example 1, again changing only the electrolyte salt, this time employing a 1.0 M solution of $LiPF_6$. The cell was discharged across a 300 ohm resistor. The average cell voltage was 1.47 V, and the average current density was 0.89 $mA/cm^2$.

EXAMPLE 4

A further $Li/PbSO_4$ cell was prepared as in Example 1, but this time employing a 1.0 M solution of $LiAlCl_4$ as the electrolyte salt. The cell was discharged across a 300 ohm resistor. The average cell voltage was 1.53 V, and the average current density was 0.99 $mA/cm^2$.

EXAMPLE 5

Another $Li/PbSO_4$ cell was prepared as described in Example 1, but this time employing a 1.0 M solution of $LiBF_4$ as the electrolyte salt. The cell was discharged across a 300 ohm resistor. The average cell voltage was 1.70 V, and the average current density was 0.98 $mA/cm^2$.

EXAMPLE 6

Another $Li/PbSO_4$ cell was prepared as described in Example 1, but this time employing a 1.0 M solution of $LiClO_4$ dissolved in 40 wt.% propylene carbonate and 60 wt.% dioxane. The cell discharged across a 300 ohm resistor. The average cell voltage was 1.42 V, and the average current density was 0.88 $mA/cm^2$.

EXAMPLE 7

Another $Li/PbSO_4$ cell was prepared as described in Example 1, except that the electrolyte was a 1.0 M solution of $LiClO_4$ dissolved in 40 wt.% propylene carbonate and 60 wt.% dimethyl carbonate. The cell was discharged across a 300 ohm resistor. The average cell voltage was 1.45 V, and the average current density was 0.90 $mA/cm^2$.

EXAMPLE 8

Another $Li/PbSO_4$ cell was prepared according to the description of Example 1, except that this time the electrolyte was a 1.0 M solution of $LiClO_4$ dissolved in 40 wt.% propylene carbonate and 60 wt.% tetrahydrofuran. The cell was discharged across a 300 ohm resistor. The average cell voltage was 1.46 V, and the average current density was 0.91 $mA/cm^2$.

EXAMPLE 9

This example illustrates the preparation of a button cell as generally shown in FIG. 3, according to the present invention.

A cathode mixture containing 85% $PbSO_4$, 5% graphite, 5% carbon black, and 5% PTFE was prepared by finely grinding and mixing 0.434 gm $PbSO_4$, 0.025 gm graphite, 0.025 gm carbon black, and 0.025 gm PTFE with a mortar and pestle. The mixture was placed in a pellet die and pressed to form a cathode wafer about 0.65 $cm^2$ in area. This cathode wafer was placed in the bottom of a button cell can, a piece of porous glass separator paper was placed on top of the cathode, and the top of the button cell can containing a 0.030 inch thick circular anode was pressed onto the separator paper. The button cell was vacuum-filled with an electrolyte solution containing a 1.0 M solution of $LiClO_4$ dissolved in 40 wt.% propylene carbonate and 60 wt.% dimethoxyethane and was then crimped shut.

Figure 4:
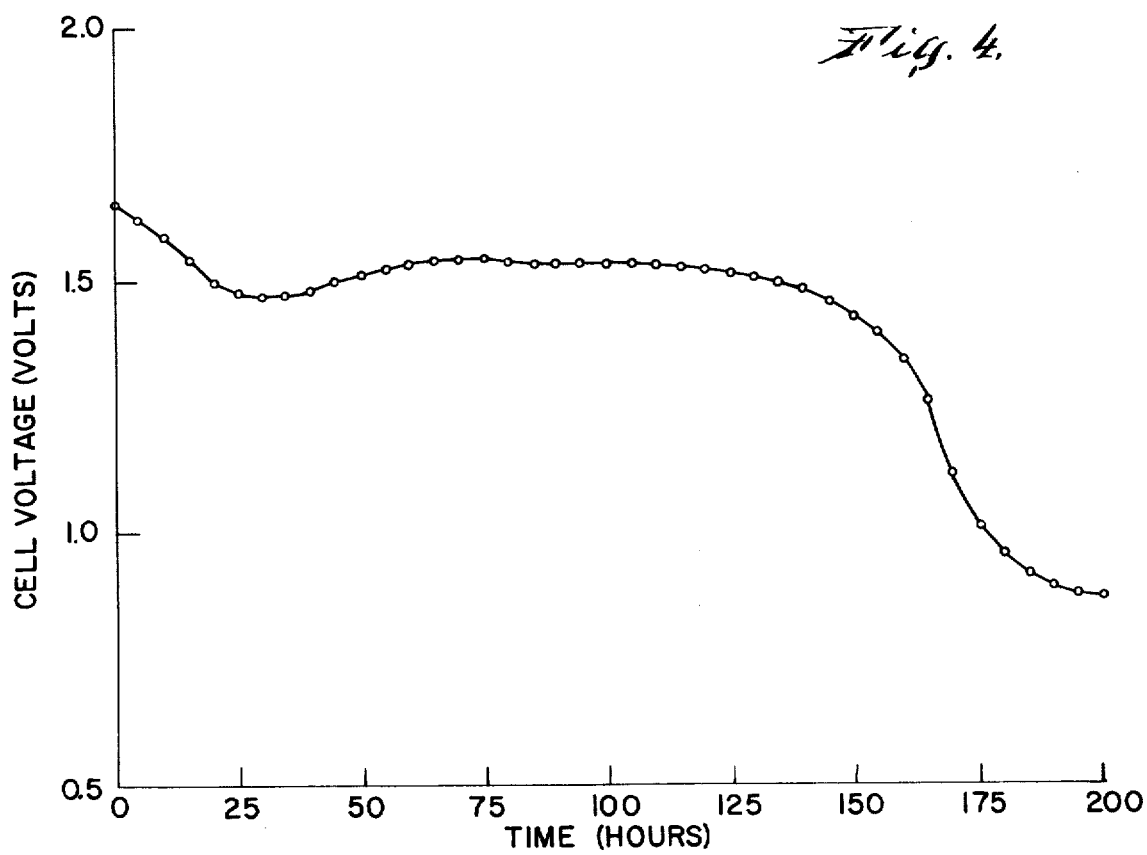
FIG. 4 is a graph showing the discharge voltage as a function of time for a cell as shown in FIG. 3 and as described in Example 9.

The cell was then discharged across a constant 4300 ohm load. The resulting discharge curve is shown in FIG. 4. The average discharge voltage was about 1.5 V, and the average current density was about 0.5 $mA/cm^2$. The discharge capacity was about 61 mAhr (to a 1.0 V cutoff).

EXAMPLE 10

This example illustrates the preparation of an AA size cell, generally as shown in FIG. 5, according to the present invention.

A cathode mixture containing 85% $PbSO_4$, 5% graphite, 5% carbon black, and 5% PTFE was prepared by mixing and finely grinding 7.00 gm $PbSO_4$, 0.42 gm graphite, 0.42 gm carbon black, and 0.42 gm PTFE, with a mortar and pestle. A large pellet die was used to pelletize the mixed cathode materials, after which the resulting cathode pellets were partially broken apart to form smaller pieces of pelletized material.

A cylindrical piece of 0.030 inch thick lithium metal was pressed onto the inside wall of a AA can, the inside bottom of which was lined with a sheet of PTFE. A cylindrical piece of porous glass separator paper was then placed against the exposed lithium surface, and the center of the AA can was filled with the pelletized cathode material. A nickel metal current collector was pressed into the center of the resulting column of cathode material and was connected to the electrically insulated center pin which passed through the top of the AA can. The cell was vacuum-filled with a 1.0 M Li- ClO$_4$ electrolyte solution containing 40 wt.% propylene carbonate and 60 wt.% dimethoxyethane as the solvent. The top of the cell was welded to the can bottom.

Figure 6:
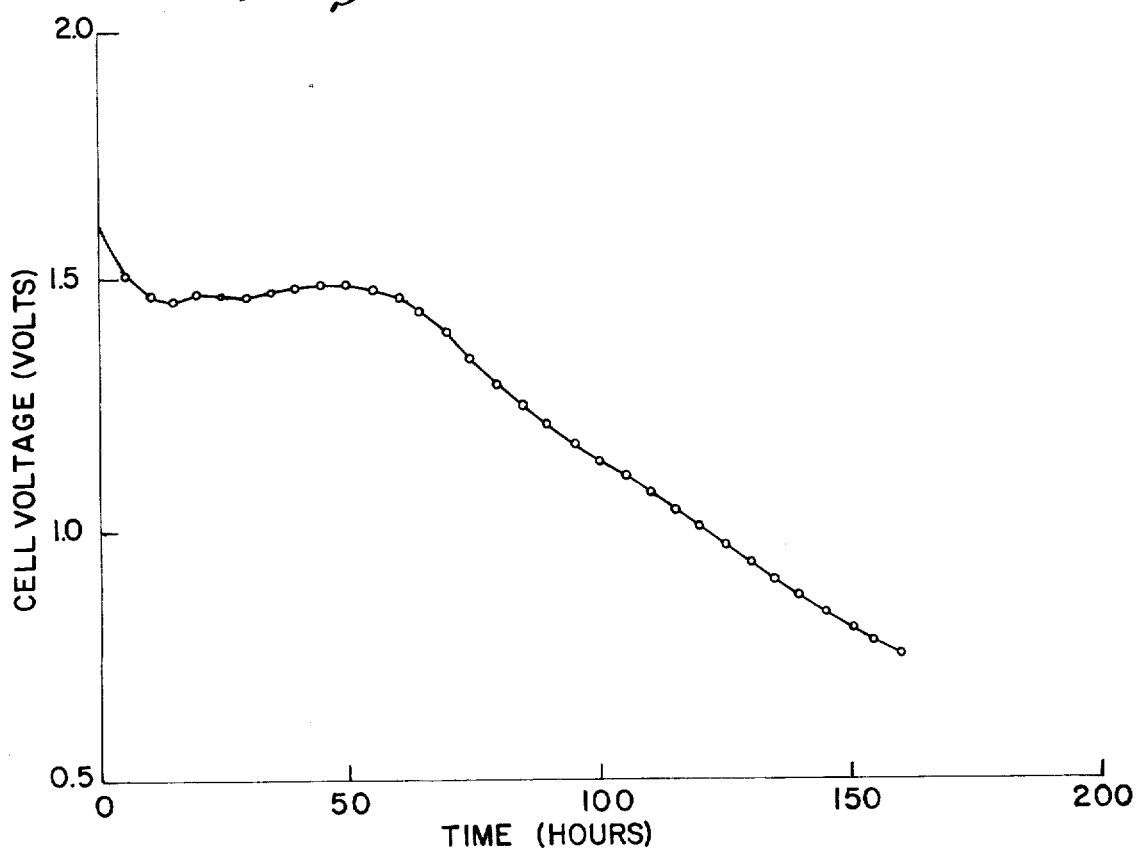
FIG. 6 is a graph showing the variation of discharge voltage with discharge time for a cell as shown in FIG. 5 and as described in Example 10.

The cell was then discharged across a constant 133 ohm resistor. The resulting discharge curve is shown in FIG. 6. The average cell voltage was about 1.4 V, and the average current density was about 0.9 mA/cm$^2$. The discharge capacity was about 1.23 Ahr (to a 1.0 V cutoff).

EXAMPLE 11

This example illustrates the construction and discharge of a cell in accordance with the present invention employing a second active cathode material to provide an indicator.

The cathode contained 49% PbSO$_4$, 21% PbS, 20% graphite, and 10% PTFE. Finely divided powders of 0.317 gm PbSO$_4$, 0.136 gm PbS, 0.129 gm graphite, and 0.065 gm PTFE were thoroughly mixed with a mortar and pestle. A pellet die was then used to press a cathode wafer about 2.5 cm$^2$ in area. An expanded nickel metal current collector was embedded within the wafer during the pressing operation. This cathode wafer was then sandwiched between two 0.030 inch thick lithium anodes as shown in the schematic diagram of the electrochemical cell in FIG. 1. A single piece of 0.005 inch thick porous glass separator paper was placed between each face of the cathode wafer and the lithium anode. Nickel metal current collectors and lead wires were used, and the cell was contained within a Pyrex glass container.

After the cell was assembled, the glass container was evacuated, and the evacuated cell was filled with an electrolyte solution containing 1.0 M LiClO$_4$ in 40% PC-60% DME. The cell was then discharged across a constant 1250 ohm resistor. The average voltage for the first portion of the discharge (about 30 hours) was about 1.67 V with an average current density about 0.26 mA/cm$^2$, while for the second portion of the discharge (about 30 to 50 hours) the average voltage was about 1.39 V with an average current density about 0.22 mA/cm$^2$.

EXAMPLE 12

This example illustrates a variation of the indicator-type cell described in Example 11.

The cathode wafer contained three layers of material. The central layer contained 70% PbSO$_4$, 20% graphite, and 10% PTFE, while each surface layer contained 70% PbS, 20% graphite, and 10% PTFE. All four constituents were in the form of finely divided powders. Thus, 0.317 gm PbSO$_4$, 0.090 gm graphite, and 0.045 gm PTFE were thoroughly mixed with a mortar and pestle. A pellet die was then used to press a cathode wafer about 2.5 cm$^2$ in area. An expanded nickel metal current collector was embedded within the wafer during the pressing operation.

Then, two PbS-containing mixtures were prepared by thoroughly mixing 0.068 gm PbS, 0.019 gm graphite, and 0.010 gm PTFE with a mortar in pestle. The pellet die was then used to press one of these PbS-containing mixtures onto each side of the previously formed PbSO$_4$-containing cathode wafer, thus forming the three layered cathode structure, and as in Example 11, the PbSO$_4$ to PbS weight ratio was 7 to 3.

An electrochemical cell containing this cathode was then assembled and tested as in Example 11. The discharge characteristics of this cell were very similar to those for Example 11.

The above disclosure is for the purpose of explaining the present invention to those skilled in the art, and is not intended to describe all those obvious modifications and variations of the invention which will become apparent upon reading the disclosure. Applicants do intend, however, to include all those obvious modifications and variations within the scope of the invention which is defined by the following claims.

What is claimed is:

1. A primary electrochemical cell comprising:
   (a) an anode comprising lithium metal;
   (b) a cathode comprising lead sulfate; said anode and cathode being spaced from each other and in contact with
   (c) an electrolytic solution which comprises a dissociable lithium salt dissolved in a liquid organic solvent.

2. A primary electrochemical cell according to claim 1 wherein the anode consists essentially of lithium metal.

3. A primary electrochemical cell according to claim 1 wherein the cathode consists essentially of lead sulfate.

4. A primary electrochemical cell according to claim 3 wherein the cathode contains an amount of a binder material effective to provide dimensional stability to the cathode.

5. A primary electrochemical cell according to claim 3 wherein the cathode contains an amount of a material selected from the group consisting of carbon black, graphite, lead powder, and mixtures thereof, which are effective to provide electronic conductivity to the cathode.

6. A primary electrochemical cell according to claim 1 wherein the organic solvent comprises propylene carbonate.

7. A primary electrochemical cell according to claim 6 wherein the organic solvent comprises a mixture of propylene carbonate with at least one other organic liquid selected from the group consisting of dimethoxyethane, dimethyl carbonate, tetrahydrofuran and 1,4-dioxane.

8. A primary electrochemical cell according to claim 7 wherein the solvent comprises from about 20 wt.% to about 60 wt.% of propylene carbonate.

9. A primary electrochemical cell according to claim 1 wherein the dissociable lithium salt is a member selected from the group consisting of LiClO$_4$, LiAsF$_6$, LiPF$_6$, LiAlCl$_4$, LiBF$_4$ and mixtures of these.

10. A primary electrochemical cell according to claim 9 wherein the dissociable lithium salt comprises LiAlCl$_4$.

11. A primary electrochemical cell according to claim 1 wherein the cathode further comprises a minor amount of a material less electropositive than the lead sulfate.

12. A primary electrochemical cell according to claim 11 wherein the material less electropositive than the lead sulfate, comprises lead sulfide.

* * * * *